Dec. 17, 1929.  W. W. DIMMICK  1,739,891
AXLE PRESS
Filed Dec. 31, 1928
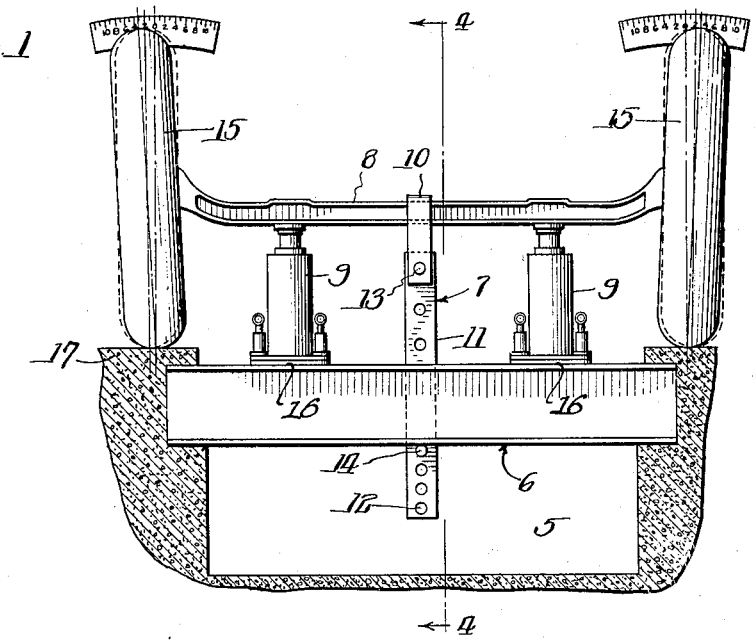
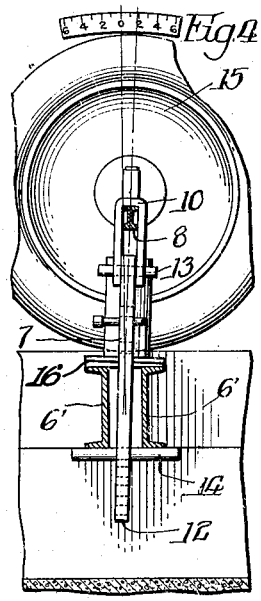
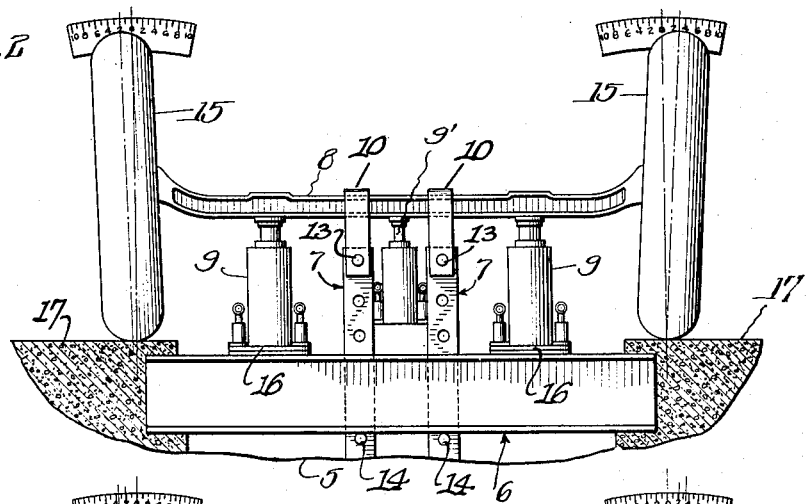
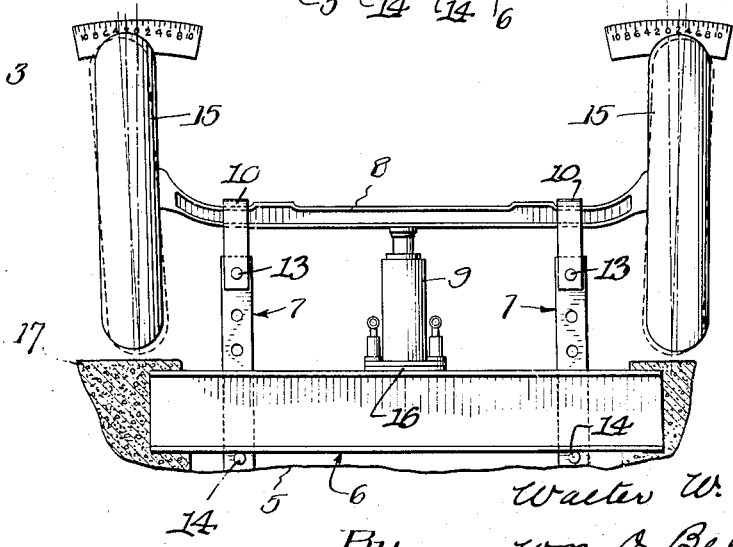
Inventor
Walter W. Dimmick
By Wm. O. Bell  Atty Patented Dec. 17, 1929

1,739,891

UNITED STATES PATENT OFFICE

WALTER W. DIMMICK, OF RACINE, WISCONSIN, ASSIGNOR TO AJAX RUBBER COMPANY, INC., OF NEW YORK, N. Y., A CORPORATION OF NEW YORK

AXLE PRESS

Application filed December 31, 1928. Serial No. 329,404.

This invention relates to axle presses and it has for its object to provide a press for operating upon the front axle of an automobile without removing any parts for easily and quickly and accurately eliminating or changing the camber of the wheels on the axle.

It has been customary heretofore to provide highways and other roads with a crown and to accommodate this crown manufacturers have made automobiles with the front wheels cambered or tilted inwardly at the bottom. The general practice now is to make highways and roads with flat surfaces and if the front wheels are cambered the wear on the tires traveling on these flat roads takes place to a greater degree at the outside of the tread instead of at the center of the tread which is made to receive the wear. Some manufacturers are now reducing the degree of camber or eliminating it entirely but many still camber the wheels and, of course, there are many old automobiles in use with cambered wheels.

My invention is designed to provide a press which may be installed in a pit in a garage or other convenient place and over which an automobile may be driven with the front axle registered with the press so that the press may be easily and quickly applied to the front axle and operated to reduce the camber of the front wheels, or to eliminate the camber entirely, without requiring any change or removal of parts of the automobile and without the necessity of providing any devices for supporting the wheels. The invention may be used, as well, for putting camber in the wheels, or for making the camber of the two wheels uniform.

The accompanying drawings illustrate a selected embodiment of the invention and referring thereto, Fig. 1 is an elevation showing the front axle with the wheels thereon arranged to have the camber of the wheels reduced or eliminated by the press, all other parts of the automobile being omitted for simplicity.

Fig. 2 illustrates the press arranged for making the camber of one wheel uniform with the camber of the other wheel.

Fig. 3 is a similar view showing the press arranged for putting camber in the wheels.

Fig. 4 is a transverse sectional view on the line 4—4 of Fig. 1 showing how the jacks are seated to operate in line with the caster of the axle.

Referring to the drawings 5 is a pit provided in the floor of a garage or other convenient place for installing the press and 6 is the base of the press which is conveniently made of two channel irons 6' arranged in parallel position and spaced apart with their ends embedded in the side walls of the pit. I am aware that the use of pits in garages and other places where automobiles are worked upon is forbidden in some states because of the danger which may result from carbon monoxide collecting therein and therefore I desire it to be understood that when I refer herein to a pit I mean to include not only such a pit as is indicated in the drawings but any equivalent therefor which will permit an operator to work beneath the automobile and operate the press, such as a stationary rack or a vertically movable rack upon which an automobile is run to elevate it above the floor level. I employ one or more anchors 7 for anchoring the front axle 8 to the base 6 and one or more hydraulic jacks 9, seated on the base and operating on the under side of the axle, according to the work to be done. Each anchor comprises a clevis 10, a link 11 having a series of openings 12 therein, a pin 13 for securing the clevis to the link and a pin 14 arranged in an opening 12 beneath the base 6. In Fig. 1 the press is shown arranged for taking the camber out of the wheels 15 on the axle 8 and it comprises a centrally disposed anchor and two jacks seated on the base and engaging the axle on opposite sides of the anchor. In practice the axle is registered with the base so that the jacks will squarely engage the axle. The front axle of an automobile is slightly inclined forwardly at its bottom and I provide seats 16 which are made wedge shape (see Figure 4) to form solid seats for the jacks on the base and to support the jacks in an inclined position to squarely engage the axle, Fig. 4. After the anchor and jacks have been properly arranged power is applied to the jacks to bend the ends of the axle upward until the wheels are upright or the camber is set to the degree desired. Hydraulic jacks are particularly desirable for this purpose because they may be operated uniformly or otherwise to bend the axle as desired. The anchor is arranged between the channel irons and the jacks are seated squarely on the base and against the axle so that there is no liability of the automobile moving forward or backward during the operation of the jacks.

For changing the camber in one wheel to make it uniform with the other wheel I provide two anchors spaced apart, Fig. 2, with a third jack 9' located between the anchors. The assembly shown in Fig. 1 might be used for this purpose but it would obviously be difficult with a single anchor and two jacks to change the camber in one wheel without to some extent changing the camber in the other wheel and therefore I prefer to use two anchors and the additional jack, Fig. 2, because either end of the axle may be bent to change the camber of its wheel without affecting the other end of the axle and its wheel. The third jack may be smaller than the others because it is used only to clamp the axle firmly against the anchors and to prevent the bending action on one end of the axle from being transmitted to the other end of the axle. In Fig. 2 the wheel at the right has a camber in excess of the camber of the wheel at the left and by operating the jack at the right the camber in the adjacent wheel can be made to correspond with the camber in the wheel at the left, or by operating both of the end jacks the camber in both wheels may be changed and made uniform or may be eliminated entirely.

For camboring the wheels I use one jack centrally disposed on the base to engage the axle midway between its ends, and two anchors located on opposite sides of the jack, Fig. 3. In this operation it is desirable to first raise the axle until the wheels clear the wheel supports 17 so that they will not drag on the supports during the cambering operation. Then the jack is operated to bend the axle upward and bring the bottom of each wheel inward as indicated in broken lines in Fig. 3.

The anchors used in all of these operations are duplicates and the jacks are also duplicates except that a smaller jack 9' may be used if desired. A large jack 9 could be used in place of the small jack 9'. The anchors and jacks may be easily and quickly applied for operation and the hydraulic jacks are easily operable. It is highly desirable, as before stated, to have the jack operate in the center plane of the axle and to have it seated squarely on the base and squarely engage the axle, and the wedge shaped jack seats form a convenient means for mounting the jacks properly on the base and in engagement with the axle. The jacks and the jack seats may be slidably adjusted lengthwise of the base to any position thereon, and this is a desirable feature because it enables the jacks to be used upon axles of any size and shape and without removing any equipment thereon. To facilitate reading the drawings I have shown broken lines on the wheels and scales adjacent thereto for indicating center lines and camber lines.

My invention provides a simple means whereby camber may be changed, eliminated or put into the front wheels of an automobile in a very few minutes without requiring any change in any part of the automobile. The driver need only drive his automobile to a proper position over the pit, the mechanic then applies the anchors and jacks as may be required and then turns the usual valves for operating the hydraulic jacks. The mechanic will be guided in the operation by reference to suitable scale devices which are applied to the wheels for determining the degree of camber before and after the operation. The simplicity of the apparatus, the speed with which it can be operated, and the small amount of labor involved are all inducements to the driver to have his wheels tested frequently and this tends to prolong the life of tires by maintaining proper operating conditions. I find it convenient to install the apparatus in a pit, but as before explained, it may be used above the floor surface with the base anchored in any suitable way to form a solid support for the jacks. In all of the operations of my apparatus the jacks are solidly supported on an immovable base and this immovable base not only facilitates the operation on the axle but it reduces the labor involved and insures accuracy of the work.

I have shown the invention in simple forms which I have found entirely satisfactory for the purposes intended but I reserve the right to make all such changes in the form, construction and arrangement of parts as may be necessary or desirable for adapting it for different conditions.

I claim:

An apparatus for bending the front axle of an automobile without removing any parts of the automobile and comprising a transverse base stationarily mounted at its ends in side supports, the front axle of the automobile being alined with said base, one or more anchors slidably adjustable lengthwise of the base and axle and detachably engaged with the axle, one or more power operated jacks slidably mounted on the base for adjustment to any position thereon to engage the axle, and detachable wedge shaped jack seats interposed between the jacks and the base for registering the jacks in the center plane of the axle.

WALTER W. DIMMICK.